United States Patent [19]

Repay et al.

[11] 4,171,873
[45] Oct. 23, 1979

[54] ANGULARLY ADJUSTABLE VEHICLE MIRROR

[75] Inventors: Laszlo N. Repay, Chagrin Falls; Thomas A. Young, Burton, both of Ohio

[73] Assignee: Tenna Corporation, Cleveland, Ohio

[21] Appl. No.: 810,319

[22] Filed: Jun. 27, 1977

Related U.S. Application Data

[63] Continuation-in-part of Ser. No. 709,161, Jul. 27, 1976, Pat. No. 4,056,253.

[51] Int. Cl.² .......................... G02B 5/08; A47G 1/24
[52] U.S. Cl. .................................... 350/289; 248/636; 248/479
[58] Field of Search .................. 350/288, 289; 248/15, 248/16, 18, 476, 479–487; 74/301M

[56] References Cited
U.S. PATENT DOCUMENTS 3,972,597  8/1976  Repay et al. .......................... 350/289

Primary Examiner—F. L. Evans
Attorney, Agent, or Firm—Watts, Hoffman, Fisher & Heinke Co.

[57] ABSTRACT

An angularly adjustable vehicle mirror with vibration damping. A casing, adapted to be secured in a mirror housing, supports a mirror back member for pivoting by a mechanism within the casing. Two rigid projections from the casing have surfaces extending generally in the direction the back member moves when it pivots relative to the casing. Vibration dampers are carried by the mirror back member remote from the pivot point of the mirror. Each damper extends rearwardly of the mirror into contact with the surface of a projection to inhibit vibration of the mirror. The vibration damping members are rigid in the direction the mirror moves but are flexible or articulated for movement transversely of the direction of mirror movement and are biased against the surfaces in slidable, frictional, engagement.

9 Claims, 5 Drawing Figures

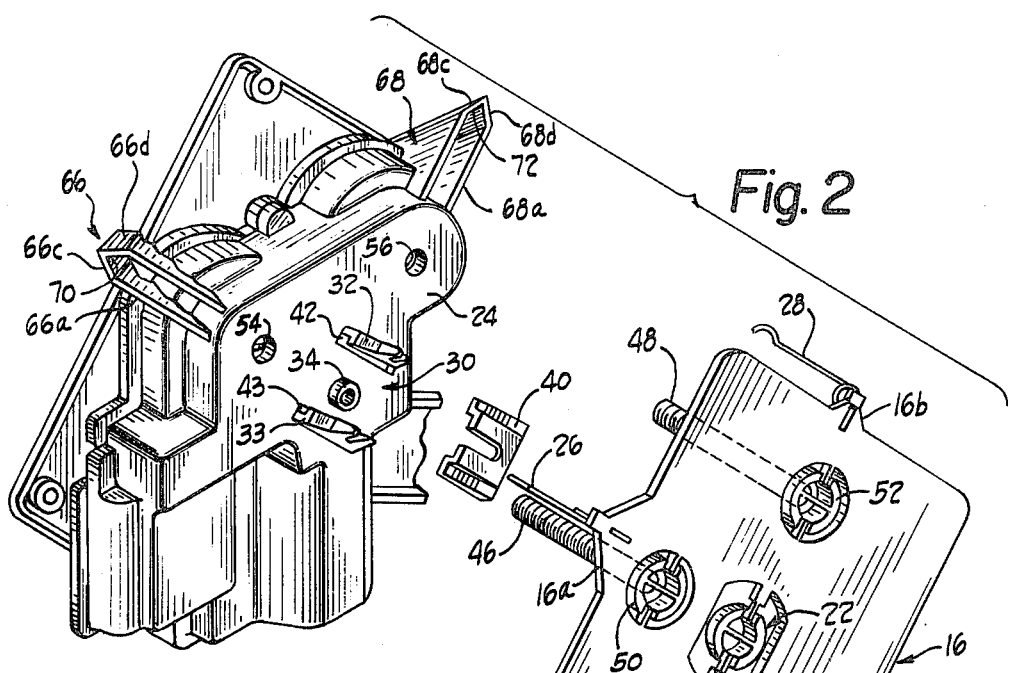

ANGULARLY ADJUSTABLE VEHICLE MIRROR

CROSS REFERENCE TO RELATED APPLICATION

This is a continuation-in-part of copending application Ser. No. 709,161, filed July 27, 1976, now U.S. Pat. No. 4,056,253.

BACKGROUND OF THE INVENTION

1. Field of the Invention

This invention relates to an angularly adjustable vehicle mirror with vibration damping.

2. Prior Art

Applicants are the inventors of an electrically adjustable vehicle rear view mirror in which an angularly adjustable mirror backplate carries vibration dampers. See U.S. Pat. No. 3,972,597. As disclosed therein, the dampers are biased into sliding contact with a mirror housing in which the backplate pivots. This arrangement effectively damps vibrations of the mirror relative to the housing and eliminates or reduces the so-called "nervous image" that occurs with centrally supported mirrors that are subjected to vibration. However, the mirror and a supporting casing, that encloses an adjusting mechanism for changing the angular position of the mirror relative to the outer housing, must be especially designed for a specific housing if the dampers are to act effectively at all angular positions of the mirror. Moreover, the cooperative relationships are established only upon installation of the mirror and casing unit in the housing, often by other than the manufacturer of the adjusting mirror and casing unit. Such an arrangement not only limits the usefulness of a particular mirror and supporting casing to a specific housing, but also makes it difficult to assure in advance that the vibration dampers will function as intended in the housing.

SUMMARY OF THE INVENTION

The present invention provides an angularly adjustable mirror in which mirror vibrations are damped by members that extend from the mirror periphery directly to a casing that both supports the mirror and contains a mirror adjusting mechanism. In this way, the casing and pivotable mirror form a unit that functions independently of the surrounding support housing in damping mirror vibration. As a result, a greater tolerance in the clearance between the housing and the mirror can be accepted and the unit lends itself to use as a replacement part for use in various housings or as original equipment for housings of different manufacturers.

Basically, the present invention utilizes one or more rigid extensions from a casing that houses an adjusting mechanism and that pivotally supports a mirror-mounting back member or plate. Each extension has a surface that coacts with a vibration damper of the back plate. In a preferred embodiment, the mirror is pivotable about two mutually perpendicular axes to provide universal adjustment and two rigid casing extensions are provided, each with a surface located adjacent the perimeter of the mirror. Each surface has a portion that extends generally in the direction an adjacent portion of the mirror moves when the mirror pivots.

One or more vibration damping members are carried by the mirror back, one adjacent each rigid extension of the casing. In a preferred embodiment, the damping members extend from the mirror back plate in a rearward direction, i.e., away from the mirror, and engage the described surfaces of the adjacent extension. The damping members are essentially rigid in that rearward direction of extent. They are, on the other hand, movable relative to the back plate in a direction transverse to the direction of mirror movement by virtue of inherent flexibility or through articulation, and are biased outwardly of the mirror periphery in the preferred embodiment into frictional, sliding, engagement with the described surfaces of the rigid extensions. To facilitate continuous contact between the surfaces and the damping members, the surfaces extend in the direction of movement of the members a distance slightly in excess of that traveled by the adjacent periphery of the mirror during its travel from one extreme of its pivoted positions to the other. The damping members and the surfaces of the extensions are preferably aligned behind the pivot axes of the mirror and back member, both for good mutual cooperation and to minimize the maximum distance of damper member travel during mirror adjustment. Flexibility or articulation of the damping members allows movement outwardly of the mirror perimeter and also in a direction about the back plate pivot axis on which the damping member is located. This, in turn, avoids the need for relative sliding on the extension surface other than along a line in a single plane. Conveniently, then, the surface can be in the form of or a part of a straight groove.

Rigidity of the damping members in the direction of pivoting movement of the mirror, coupled with the frictional engagement of the damping members with the adjacent surfaces of the supporting casing under a significant biasing force, serves to damp vibration of the mirror relative to the casing. This damping is particularly effective because it occurs at locations adjacent the perimeter of the mirror; actually, beyond the perimeter in the preferred embodiment. The damping without interaction between the damping members and the housing that surrounds the mirror allows the manufacturer to assure proper performance without reliance upon the care or accuracy with which subsequent assembly is accomplished or upon the structure of the housing in which the unit is mounted.

The above and other features and advantages of this invention will become better understood from the detailed description that follows, when considered in connection with the accompanying drawings.

BRIEF DESCRIPTION OF THE DRAWINGS

FIG. 2 is a partial exploded view showing the mirror assembly casing and mirror-mounting back plate, viewed from different perspective than FIG. 1;

FIG. 3 is a perspective view of the mirror-mounting back plate of the assembly shown in FIGS. 1 and 2, with a mirror attached, illustrating the manner in which vibration dampers are secured;

FIG. 4 is a sectional view taken along the line 4—4 of FIG. 3; and

FIG. 5 is a partial side elevation view, with parts in section, illustrating the manner in which the vibration dampers cooperate with casing extensions, and showing the cooperation in two different positions of the back plate.

DETAILED DESCRIPTION OF A PREFERRED EMBODIMENT

Figure 1:
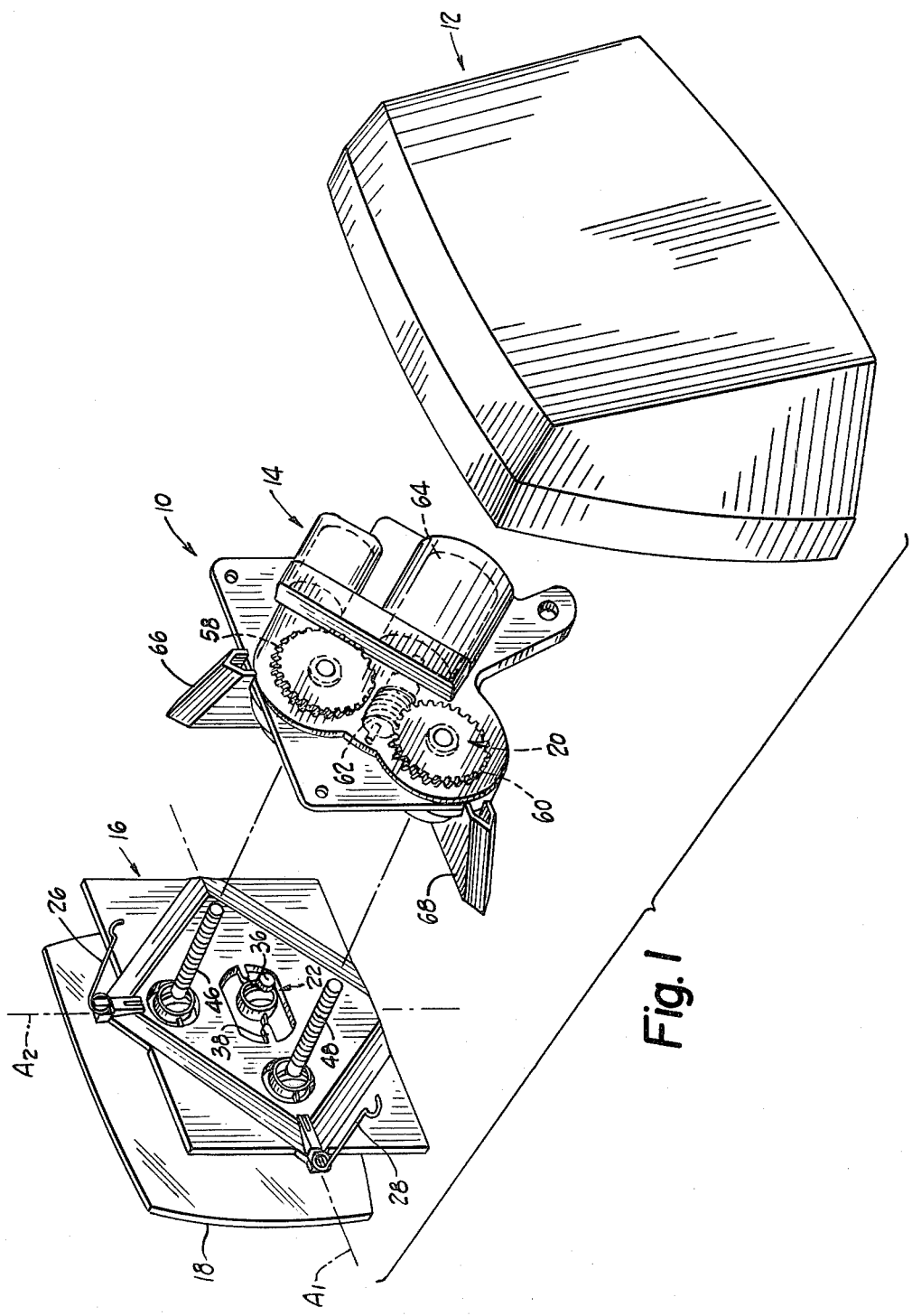
FIG. 1 is an exploded, perspective, view with parts in phantom, of an adjustable rear view mirror assembly embodying the invention.

An angularly adjustable mirror assembly 10 is shown in FIG. 1, embodying the present invention. The embodiment shown is an electrically adjustable rear view mirror for automotive use. The assembly 10 is supported in use within an outer housing 12, and comprises a casing 14, a mirror-mounting back member or plate 16, and a mirror 18. The outer housing 12 is constructed to be secured to a vehicle and to support the casing 14, which is secured within the housing by suitable fasteners, not shown. The casing 14 pivotably supports the mirror-mounting back member 16 and contains an adjusting mechanism, shown in phantom and indicated generally by reference numeral 20 in FIG. 1, that is electrically operated to pivot the back member 16 and mirror 18 relative to the casing 14 and housing 12. The mirror-mounting back member 16 is secured at a central pivoted portion 22 to the front surface 24 of the casing 14. The mirror 18 is secured on the opposite side or front of the mirror-mounting back member 16 from the support portion 22, preferably by a suitable adhesive. Damping members 26, 28 are supported by the back member 16, located to contact the casing 14 and inhibit vibration of the mirror relative to the casing.

Both the casing 14 and the mirror back member 16 are preferably injection molded of suitable plastic, e.g., a polyester. The casing 14 has suitable back member mounting structure 30 on the front surface 24 (see FIG. 2). In the preferred embodiment shown, this mounting structure includes two spaced cradles 32, 33 and a central, hollow, boss 34. The boss 34 receives a universally pivoted stud 36 of the support portion 22 of the back member. A yoke 38 of the support portion 22 is supported by the cradles 32, 33 to guide the back member in pivoted movement about two mutually perpendicular axes A1, A2. The stud 36 is held within the boss 34 by a wedge 40 that is slidably received in grooves 42, 43 of the cradles 32, 33, respectively. Details of the manner in which the mirror-mounting back member 16 is interconnected for pivoting to the casing 14, as well as the manner in which the back member is pivoted by the mechanism 20, is disclosed in more detail in the copending application Ser. No. 709,161, filed July 27, 1976, Laszlo N. Repay and Thomas A. Young, inventors, and assigned to the assignee of this application. The said copending application is hereby incorporated herein by reference.

Adjusting members 46, 48 (screws in the preferred embodiment) extend from the back member 16 toward the casing 14, and are connected to the back member by universal pivots 50, 52 integral with the back member. The adjusting members are received in apertures 54, 56 of the casing and are driven axially relative to the casing by rotatable nuts 58, 60 (shown in phantom in FIG. 1), which are selectively driven by a worm 62 on an electric motor 64 to adjust the angle of the back member and mirror relative to the casing (all as disclosed in more detail in said aforementioned copending application. See also U.S. Pat. No. 3,972,597.

For damping vibration of the mirror 18 and mirror back member 16, two rigid extensions 66, 68 project from the casing 14. In the preferred embodiment shown, the extensions 66, 68 are integrally molded parts of the casing 14. Each extension has a surface 70, 72, respectively, that extends from a front portion 66a, 68a of the extension toward a back portion 66b, 68b (FIGS. 2 and 5) and that includes a line element in a plane perpendicular to the front surface 24 of the casing and through the center of the boss 34.

In the preferred embodiment shown, the extensions 66, 68 are in the form of tunnel-like structures in which each surface 70, 72 is formed by the juncture of two flat converging portions 66c, 66d and 68c, 68d of the projections. The converging portions 66c, 66d and 68c, 68d and the surfaces 70, 72 are angularly related to the plane of the front surface 24 of the casing so that extensions of the surfaces 70, 72 rearwardly of the casing would intersect the center axis of the boss 34 behind the casing. The angular relationship is such that the surfaces 70, 72 follow approximately the path of the vibration dampers 26, 28 during pivoting of the mirror back member 16 relative to the casing (see FIG. 5), although the dampers are constructed to adjust as necessary to maintain contact with the surfaces 70, 72.

The two extensions 66, 68 project from the casing generally along mutually perpendicular planes that pass through the central boss 34; i.e., the extensions are displaced from each other 90 angular degrees. Each is adjacent and behind a pivot axis A1, A2 of the back member 16.

The damping members 26, 28 in the embodiment disclosed are spring wire, each with a coil portion 26a, 28a, respectively, and with one extending end 26b, 28b anchoring the damping member by being received in a passage 76, 78 (FIGS. 3 and 4) at the rear of the back member. A second end 26c, 28c of each spring wire damping member extends rearwardly of the mirror back member 16 and terminates in a curved portion 26d, 28d that is convex in the direction outwardly of the back member margin, to provide a runner-like portion to engage and slide with respect to the surfaces 70, 72 of the extensions 66, 68. This end 26c, 28c of each damping member extends at an obtuse angle relative to the securing end 26b, 28b when the spring is not stressed. This condition is shown in FIG. 4 of the drawings. The locations of the extension surfaces 70, 72 behind the mirror back member are such that the springs of the damping members are stressed when the curved ends 26d, 28d are against the surfaces 70, 72, as illustrated in FIG. 5. Other constructions of damping members may be used, such as integrally formed projections with the mirror back member, which can have inherent resiliency in the outward biasing direction, or which can have additional biasing afforded by independent springs.

Two pivoted positions of the back member 16 are illustrated in FIG. 5, showing the manner in which the spring portion 26a of the damping member 26 and the extending portion 26c are kept stressed to approximately the same degree throughout the change in the angular relationship between the back member 16 and the casing 14 during mirror adjustment. The angular relationship is kept substantially constant by the slope or angle of the surface 70 relative to the plane of the front of the casing.

In the preferred construction, as best shown in FIG. 4, the back member 16 has peak-like marginal extensions 16a, 16b that support the damping members 26, 28, respectively, at a location outwardly of the margin of the mirror 18. This provides a relatively long moment arm from the central support portion 22 of the mirror back and enhances the damping effect of the members 26, 28. The portions 16a, 16b also locate the damping members in a position where they will clear the casing 14 in their path of movement during pivoting of the mirror.

To most effectively damp vibration of the mirror back member, the damping members are essentially rigid in the direction of their extent from the mirror back member, i.e., in the direction in which the mirror margin moves during pivotal adjustment. The resilience provided by the spring portion 26a, 28a acts essentially only at right angles to the direction of extent of the portions 26c, 28c, in biasing the damping members against the surfaces 70, 72. Thus, a construction is achieved which provides a resiliency for maintaining frictional contact between the damping members and the casing, yet which provides essentially no flexibility in the direction of mirror movement, in which direction the damping action is required. Substantial force is exerted between the damping members and the surfaces 70, 72 by the spring portion 26a, 28a of the damping members so that movement of the damping members by vibrational forces is resisted. That is, substantial force is required to overcome the frictional engagement between the damping members and the casing, whereby vibration of the mirror is restrained.

By virtue of the construction and location of the dampers and the rigid extensions of the casing, vibration of the mirror and mirror back relative to the casing throughout the range of pivoting is inhibited independently of the housing 12.

While a preferred embodiment of the present invention has been described in detail, it will be appreciated that various modifications or alterations may be made therein without departing from the spirit and scope of the invention set forth in the claims.

What is claimed is:

1. An adjustable mirror support comprising:
   a mirror-mounting back member,
   a casing for containing a mirror adjusting mechanism,
   a pivot connection between the back member and the casing,
   a rigid extension from the casing with a surface extending as great a distance as and generally in a direction in which the back member moves when it pivots relative to the casing,
   a vibration damping member carried by the back member and extending therefrom in the general direction of back member movement and into contact with said surface, the vibration damping member being relatively rigid in the direction in which the back member moves, and yieldably biased in a direction transverse to the direction in which the back member moves and into contact with said surface, said vibration damping member and surface being in sliding, frictional, contact.

2. A mirror support as set forth in claim 1 wherein said vibration damping member is elongated in the direction in which it extends from the back member and a distal portion of the damping member engages said surface.

3. A mirror support as set forth in claim 2 wherein said vibration damping member is a wire spring.

4. A mirror support as set forth in claim 1 wherein said back member is generally planar, said surface is behind the back member in all pivoted positions of the back member relative to the casing, and said surface is inclined relative to the plane of the back member when the back member is in a position intermediate the extremes of its pivoted positions relative to the casing.

5. An adjustable rear view vehicle mirror comprising:
   a mirror,
   a planar back member on which the mirror is mounted,
   a casing,
   a mirror adjusting mechanism within and extending from the casing to the back member,
   a pivot connection between the casing and a central portion of the back member,
   a projection extending from the casing adjacent an outer edge of said back member, said projection having an elongated surface extending in a direction generally toward and away from said outer edge for a distance at least as great as that through which said outer edge moves during pivoting of the mirror, and facing toward said pivot connection,
   a vibration damping member carried by the back member adjacent said outer edge, extending therefrom into contact with said surface and movable along said surface during pivoting of the back member relative to the casing, and
   means yieldably biasing said vibration damping member into sliding contact with said surface.

6. An adjustable mirror as set forth in claim 5 wherein at least two such projections extend from the casing and at least two such vibration damping members are carried by the back member, each damping member cooperating with a projection; the projections being displaced from each other about the pivot connection a distance of 90 angular degrees.

7. An adjustable mirror as set forth in claim 6 wherein said surface of each abutment is located beyond the adjacent outer edge of the back member and behind the plane of the back member.

8. An adjustable mirror as set forth in claim 7 wherein each vibration damping member is a wire spring carried by a portion of the back member that extends beyond the periphery of the mirror.

9. An adjustable mirror support comprising:
   a mirror-mounting back member,
   a casing for containing a mirror adjusting mechanism,
   a pivot connection between the back member and the casing,
   a rigid surface on one of the casing and back member extending as great a distance as and generally in a direction in which the back member moves when it pivots relative to the casing,
   a vibration damping member carried by the other of the casing and back member and extending therefrom in the general direction of back member movement and into contact with said surface, the vibration damping member being relatively rigid in the direction in which the back member moves, and yieldably biased in a direction transverse to the direction in which the back member moves and into contact with said surface, said vibration damping member and surface being in sliding, frictional, contact.

* * * * *